United States Patent [19]

Palm et al.

[11] 4,414,192

[45] Nov. 8, 1983

[54] METHOD OF PRODUCING A HIGHLY REACTIVE PITCH FRACTION AND ITS USAGE

[75] Inventors: Jürgen Palm, Oer-Erkenschwick; Herbert Glaser, Gladbeck; Gerd Collin, Duisburg; Rolf Marrett; Maximilian Zander, both of Castrop-Rauxel, all of Fed. Rep. of Germany

[73] Assignee: Rutgerswerke Aktiengesellschaft, Frankfurt, Fed. Rep. of Germany

[21] Appl. No.: 415,636

[22] Filed: Sep. 7, 1982

[30] Foreign Application Priority Data

Oct. 29, 1981 [DE] Fed. Rep. of Germany ....... 3142826

[51] Int. Cl.$^3$ .................. C01B 31/02; C10C 3/02; C10C 3/08; D01F 9/12
[52] U.S. Cl. ................................ 423/445; 208/22; 208/39; 208/44; 208/45; 423/448; 423/449; 423/447.4; 423/447.6
[58] Field of Search ............... 208/39, 44, 45, 22, 208/50; 423/445, 449, 448, 447.1, 447.4, 447.6

[56] References Cited

U.S. PATENT DOCUMENTS

| | | | |
|---|---|---|---|
| 3,997,654 | 12/1976 | Kölling et al. | 423/447.4 |
| 4,029,749 | 6/1977 | Murakami | 423/449 |
| 4,137,150 | 1/1979 | Pietzka et al. | 423/449 X |
| 4,379,133 | 4/1983 | Zander et al. | 423/445 |

FOREIGN PATENT DOCUMENTS

| | | | |
|---|---|---|---|
| 2029435 | 10/1971 | Fed. Rep. of Germany | 208/44 |
| 2627078 | 12/1977 | Fed. Rep. of Germany | 208/45 |
| 1423343 | 11/1965 | France | 423/445 |
| 1356569 | 6/1974 | United Kingdom | 208/44 |

*Primary Examiner*—Edward J. Meros
*Assistant Examiner*—Steven Capella
*Attorney, Agent, or Firm*—Beveridge, DeGrandi & Kline

[57] ABSTRACT

A method of producing a highly reactive pitch fraction is disclosed. Coal-tar pitch is extracted with hot chloroform and the pitch solution treated with solid iodine. The solid reaction products are separated and, in the presence of chloroform, decomposed with an aqueous ammonia solution. Following separation of the aqueous phase and removal by distillation of the chloroform, there remains a highly reactive pitch fraction which can be converted into high-anisotropic carbon at low temperatures and in short coking times.

4 Claims, No Drawings

METHOD OF PRODUCING A HIGHLY REACTIVE PITCH FRACTION AND ITS USAGE

The invention relates to a method of producing highly reactive pitch fractions which can particularly be used in the continuous-process production of carbon.

Standard coal-tar pitch, a distillation residue of commercial coal-tar distillation, is primarily utilized in the production of high-anisotropic, commercial carbon. For example, the derivative products electrode binding agents and pitch coke are required for the manufacture of electrodes in the metallurgical, as well as in the graphite and artificial carbon industries. In addition, high-grade materials, such as carbon threads, can also be fabricated from coal-tar pitches.

A disadvantage of all these methods for converting coal-tar pitch into anisotropic carbon has been the long coking times at temperatures between 450° and 550° C. This is especially true for continuous carbonization processes such as proposed, for example, for the production of carbon threads.

It is well known that through the use of suitable catalysts and additives such as, for example, aluminum chloride and sulphur, coking temperatures can be reduced and coking times shortened. However, this method leads to residual impurities in the carbon which affect its properties, proving acceptable only in limited instances.

The production of high-anisotropic coke from pitch extracts is known as well. However, existing methods have the disadvantage that long coking times are required at low coking temperatures of less than 450° C.

Moreover, the fractionation of coal-tar pitch by means of picric acid as a method of analysis has been described (Compendium 77/78, Supplementary Volume, Oil & Gas, Natural Gas, Petrochemistry, pages 235-251, in German).

Therefore, there remained the task of developing a method of extracting a highly reactive pitch fraction which can be converted quickly even at low temperatures into a high-anisotropic carbon and which can be obtained in high yields from coal-tar pitch.

This object is accomplished by dissolving a coal-tar pitch extract in liquid chloroform and treating this with 1-10% by weight of solid iodine at room temperature with agitation for 1 to 3 hours. The solid reaction products are separated and, in the presence of chloroform, decomposed with an aqueous ammonium solution. After separation of the aqueous phase and removal by distillation of the solvent in a manner in itself known, the highly reactive pitch fraction remains as residue.

The pitch fraction which has been extracted by transformation with iodine is then converted into high-anisotropic carbon at temperatures of 425° C. or higher and at pressures up to 10 bar for 1 to 2 hours, preferably on a continuous basis.

The solvent can be reused for further extractions before it must be reprocessed by distillation. The distillation residue is free from ashes and solid carbon and is therefore a high-grade raw material which can be used as an impregnating agent or can be processed into a binding agent for electrodes in a manner in itself known instead of selected standard pitches.

The invention will now be illustrated with reference to an example. For comparison's sake, the production of a pitch fraction by means of picric acid is described.

EXAMPLE 1 kg of standard coal-tar pitch with a Krämer-Sarnow softening point of 72° C. is extracted under agitation with 10 kg of boiling chloroform. The solution is cooled to room temperature and the undissolved portion (206 g) is removed by filtration. The pitch dissolved in chloroform is placed in an agitator and 50 g of solid iodine is gradually added at room temperature. After two hours reaction time, the precipitated product is removed by filtration (242.6 g).

The solvent can be recycled for further extractions before it must be reprocessed by distillation. The pitch-like distillation residue can be used as an impregnating agent or processed into a high-grade binding agent for pressed solid carbon products.

The filtration residue is suspended in 10 kg of chloroform and treated four times with a 2-liter solution of 15% aqueous ammonia. Following separation of the aqueous phase and reprocessing by distillation of the chloroform, 189.6 g of a highly reactive pitch fraction is obtained. This product is heated to a temperature of 425° and coked for 80 minutes at a pressure of 3 bar. Coke is obtained in 86% yield having a large-area anisotropic crystalline structure, a volatile-matter content of 8.3%, and a true density of 2.179 g/cm$^3$ of the coke calcined at 1300° C.

COMPARATIVE EXAMPLE 1 kg of standard coal-tar pitch with a Krämer-Sarnow softening point of 72° C. is extracted under agitation with 50 kg of boiling toluene. The solution is cooled to room temperature and the undissolved portion (199 g) removed by filtration. The pitch, dissolved in toluene, is placed in an agitator and 40 g of picric acid dissolved in 1.25 kg of toluene is added at room temperature. After 30 minutes reaction time the precipitated product is removed by filtration (117 g).

The filtration residue is suspended in 10 kg of chloroform as in the previous example and treated with a 15% aqueous ammonia solution. After removal of the aqueous phase and removal by distillation of the chloroform, 98 g of a highly reactive pitch fraction is obtained. This product is heated to a temperature of 425° C. and coked for 70 minutes at a pressure of 10 bar. A coke is obtained in 88% yield having a large-area anisotropic crystalline structure, a volatile-matter content of 8%, and a true density of 2.178 g/cm$^3$.

As shown by the comparative example, using the picric acid method, the yield of highly reactive pitch is only about half as large as the method of the invention.

We claim:

1. A method of producing a highly reactive pitch fraction from a coal-tar pitch solution obtained through extraction, comprising treating a coal-tar pitch extract in a chloroform solution with 1-10% by weight of solid iodine at room temperature with agitation for 1-3 hours to obtain solid reaction products, separating said products and, in the presence of chloroform, decomposing said products with an aqueous ammonium solution and, following separation of the aqueous phase and removal by distillation of the solvent, recovering the highly reactive pitch fraction as a residue.

2. The method according to claim 1, wherein the chloroform, following the treatment with iodine and separation of the solid reaction products, is reused at least partially for extracting the coal-tar pitch.

3. The method according to claim 1, wherein the chloroform, following the treatment with iodine and separation of the solid reaction products, is at least partially reprocessed by distillation and the distillation residues processed into electrode binding and impregnation agents.

4. A method for making highly anisotropic carbon comprising treating the pitch fraction obtained according to claim 1 at temperatures of at least 425° C. at pressures of 1-10 bar for 1-2 hours.

* * * * *